United States Patent [19]
Nakahara

[11] Patent Number: 5,862,965
[45] Date of Patent: Jan. 26, 1999

[54] USER FRIENDLY CONTAINER HIDDEN BEHIND BICYCLE HEAD TUBE

[76] Inventor: Toshikazu Nakahara, 4-8-25 Aotani-cho, Nada-ku Kobe, Japan, 657

[21] Appl. No.: 906,547

[22] Filed: Aug. 5, 1997

[51] Int. Cl.[6] ........................................................ B62J 11/00
[52] U.S. Cl. ............................ 224/426; 224/425; 224/419
[58] Field of Search .................................... 224/426, 425, 224/412, 419, 420, 421, 428, 430, 431

[56] References Cited

PUBLICATIONS

Athletic Products & Services, "New Products" (advertisement showing Snak–Pak), *Triathlete*, Jun., 1990, p. 38, Issue No. 79, Triathlete Productions, Inc., Allentown, PA.

*Primary Examiner*—David J. Walczak

[57] ABSTRACT

A container for articles such as food which is snuggled behind the head (vertical) tube and rests on the top (horizontal) tube of a bicycle. The container includes a relatively narrow width so as to hide behind the head tube such that the container adds no wind resistance to the bicycle. The relatively narrow width further provides no interference to thigh and knee pedaling action. The container includes a relatively elongate lid which may extend up and over articles such as bananas. A Velcro® connector band on the lid engages a Velcro® connector band on the receptacle to close off the receptacle. The connector band on the receptacle is relatively wide such that the connector band on the lid may be fixed to upper or lower portions of the connector band on the receptacle to thereby tighten or loosen the lid. The lid is flexible such that its connector band may be fixed at an angle to the connector band on the receptacle so that the lid may be partially twisted around elongate articles such as bananas and still make a connection to the connector band on the receptacle. The lid includes a mesh or is macroscopically apertured to permit the one riding the bicycle to see into the receptacle. The receptacle includes walls with stiffeners. Straps extend from the receptacle to the head and top tubes. Two straps extend from the receptacle to the top tube to minimize twisting of the receptacle relative to the top tube.

20 Claims, 4 Drawing Sheets

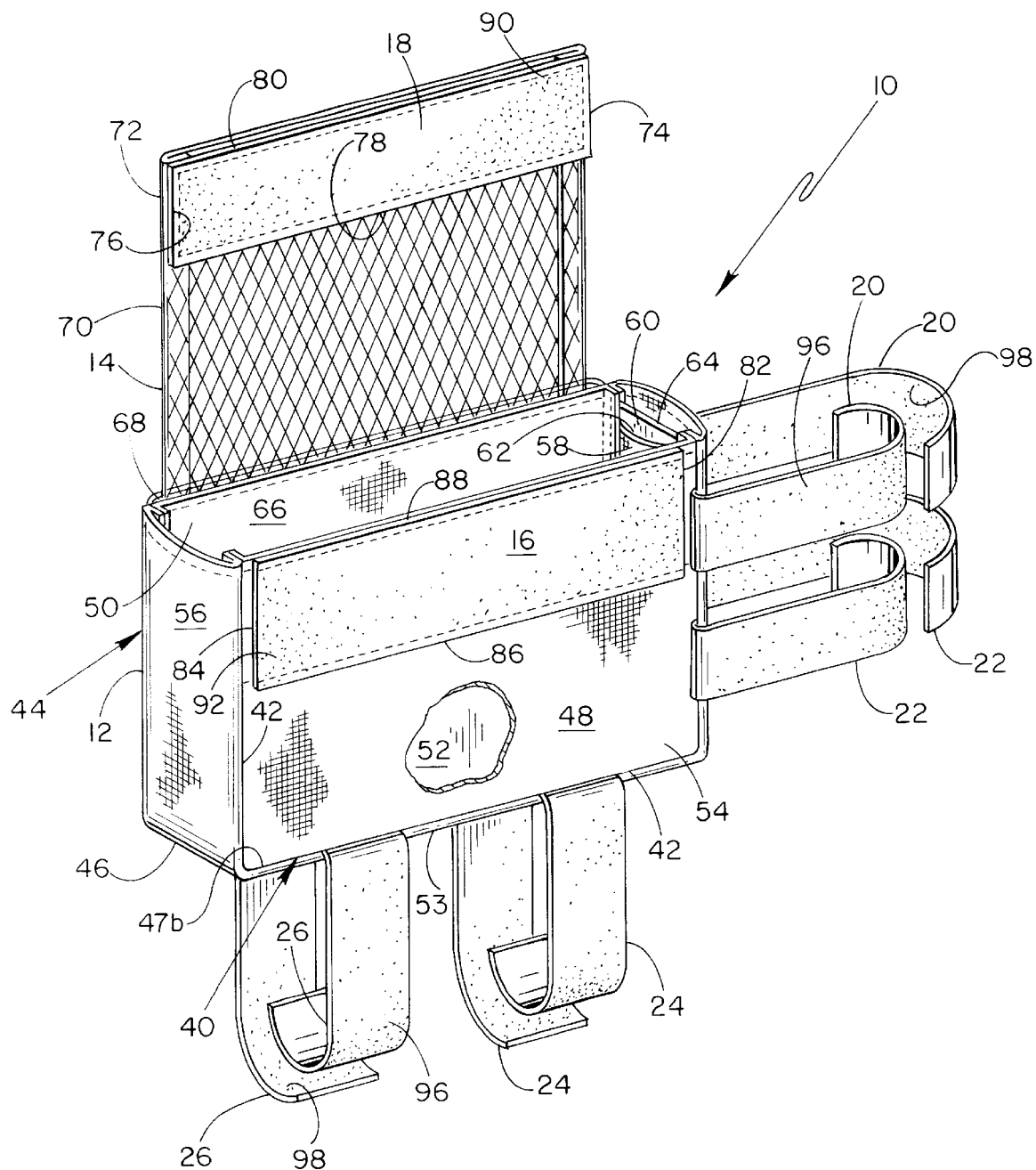

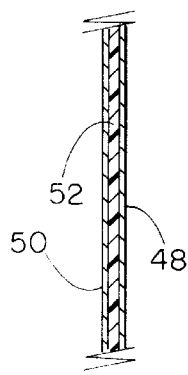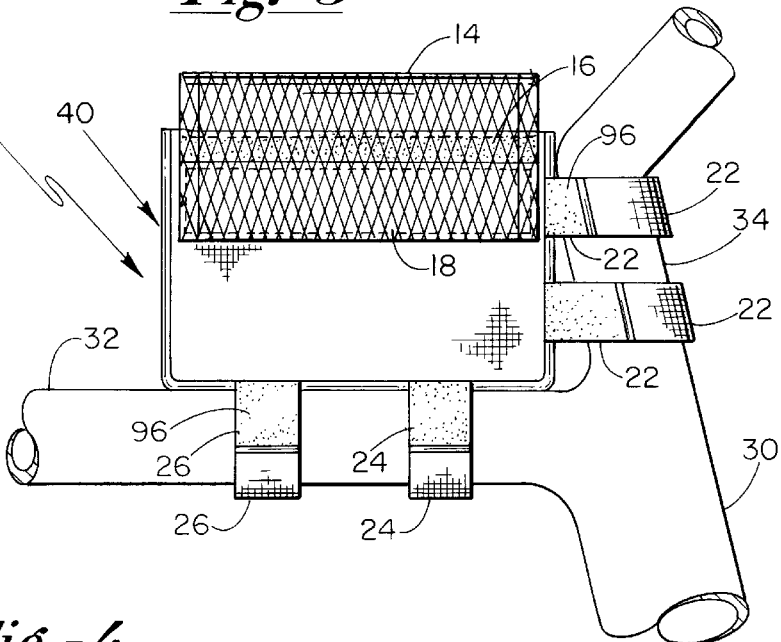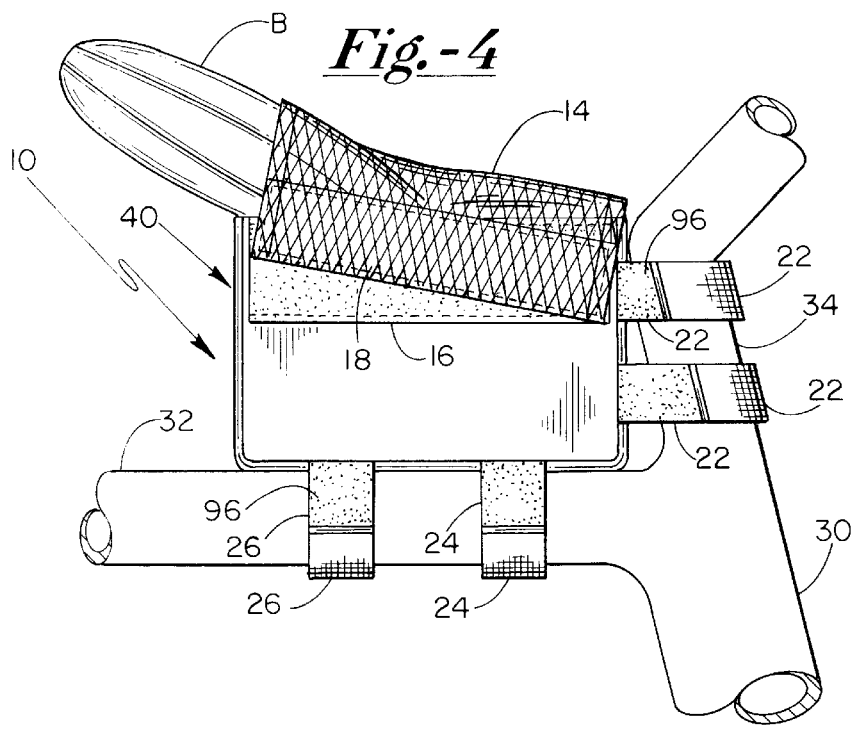

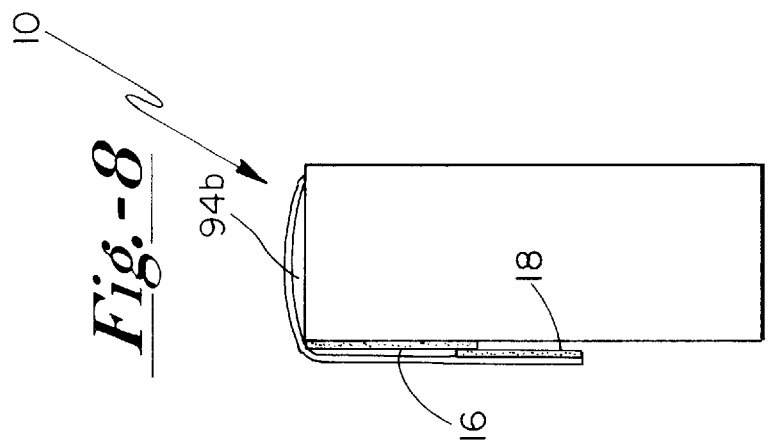
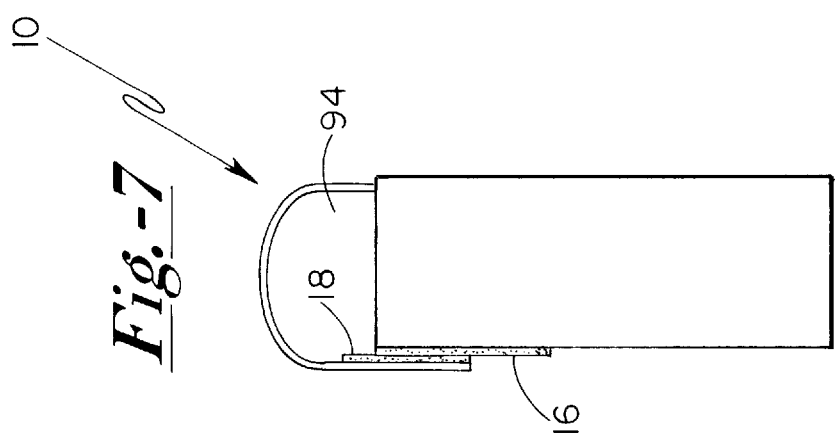
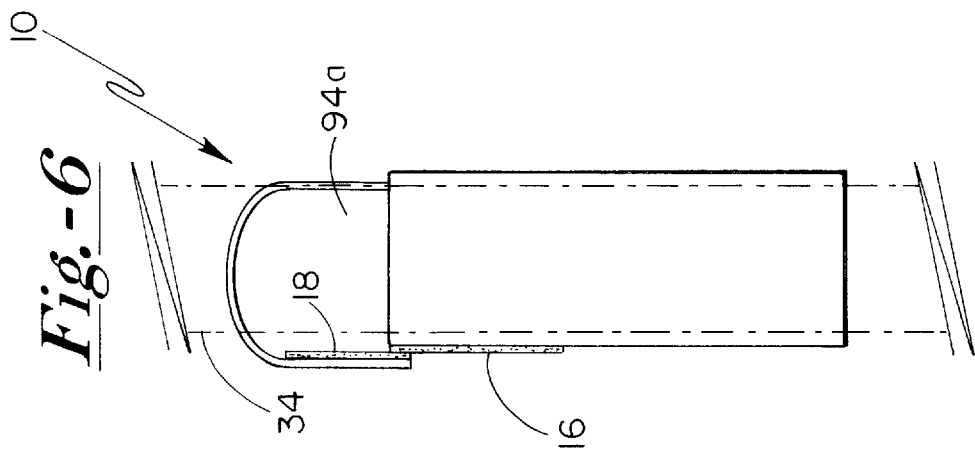

USER FRIENDLY CONTAINER HIDDEN BEHIND BICYCLE HEAD TUBE

BACKGROUND OF THE INVENTION

The present invention relates generally to containers, particularly to containers for bicycles, and specifically to containers for being carried on the top tube and behind the head tube of the bicycle.

Bicycle racing places a prime importance on aerodynamics. For example, it is not sufficient that the superlight bicycle frame be formed of carbon kevlar. Such a superlight frame must also be shaped to cut through the air. Even wheel rims are shaped to minimize wind resistance. With his or her aerodynamic helmet, the rider leans over aerobars to place his or her body in an aerodynamic position. Such examples are but a few.

One further example is the use of the space that lies behind the head tube. The head tube conventionally is a generally vertical tube at the front portion of the bicycle frame which houses the stem. The stem is the integral base of the handlebars, and the stem may be adjusted up and down in the head tube to custom fit the handlebars or aerobars for the rider. A top tube extends rearwardly from the head tube toward the seat.

Since the head tube cuts the air, the space behind the head tube may be used to advantage. One use is the placement of a container in the space. High energy food or high energy gels are examples of articles that may be placed in such a purposefully located container.

Besides being placed on the bicycle in a position where minimal wind resistance will result, the container occupies a space which is convenient for the rider. The space is located close to the handlebar—or aerobar. Even when in the tuck position, the rider may readily access a container located at such a space. Since the location is convenient, the location is safe. One hand may stay on the aerobar while the other hand grabs a banana. There is no need to play "Look, Ma, no hands!"

SUMMARY OF THE INVENTION

A general object of the present invention is to provide a unique container for the space on the bicycle located behind the head tube above the top tube.

Another object of the invention is to provide for a relatively narrow bag which is roughly the width of the head tube of a conventional ten-speed or racing bicycle so as to hide behind the head tube and put such a space to use without increasing the wind resistance of the bicycle.

Another object of the invention is to provide such a container which is user friendly.

More specifically, the container has user friendly features such as a wide connector base or strip on the body of the container. The wide connector base or strip engages another connector strip on the lid such that the container may be closed. The wide connector base permits: a) an imperfect alignment between the strips, such as when the strips are engaged at an angle to each other, but a still secure closure between the lid and the body of the container; and b) for a given volume of contents, a relatively loose fit between the lid and body of the container when the strip on the lid is engaged at a relatively high position on the wide connector strip on the body, or a relatively tight fit when the strip on the lid is engaged at a relatively low position on the wide connector strip on the body, thus permitting an adjustment, such as a tightening, of the lid.

Another user friendly and unique feature of the container is that the connection between the lid and the body of the container includes quick connect and release connectors such as hook and loop connectors.

Another user friendly and unique feature of the container is that the lid is flexible, thus permitting the lid to extend over obliquely shaped articles such as bananas.

Another user friendly and unique feature of the container is that at least a portion of the lid is formed of mesh, thereby permitting the rider to make last minute double checks to the contents of the container without opening the lid.

Another user friendly and unique feature of the container is that the body of the container has a high degree of stiffness and a high degree of flexibility. The walls of the body of the container include stiffeners such that the container may maintain an open position without collapsing walls whereby the rider may easily pick out an article without a digging. Such stiffeners terminate short of the corners of the container to permit such corners to act as articulating joints, lending flexibility to the bag in its permanently maintained open shape.

Another user friendly and unique feature of the container is that the lid, when extending from sidewall to sidewall, may loop up and over the opening of the container so that contents of the bag may extend upwardly beyond the sidewalls of the container.

Another user friendly and unique feature of the container is that when closed an opening may be formed between the end wall and the lid so as to permit rather elongate articles such as bananas to extend through such opening.

Another user friendly and unique feature of the container is that the lid is about the height of the sidewall such that the lid may be tucked inside the body of the container to lie flat against the sidewall in an out-of-the-way position.

Another user friendly and unique feature of the container is that quick connect and release straps are provided for connecting the container to the head tube and to the top tube.

One main advantage of the present invention is that it is user friendly and thus safe. During competition at high speeds, the lid may be easily opened and closed with one hand without diverting one's eyes from the road and while keeping the other hand on the handlebars or aerobar. The quick connect and release connectors permit an easy opening with one hand. The stiffeners keep the connector open while the hand picks out an article such as a small bottle of high energy food gel. The wide connection band and flexible lid permit a fast and secure closing of the lid with one hand, even when the lid connection band and the container body connection band are misaligned.

Another advantage is that the container fits neatly behind the head tube and thus holds any increase in wind resistance to the bicycle to a minimum.

Another advantage is that the container is light and thus holds any increase in weight to the bicycle to a minimum.

Another advantage is that the container is sufficiently narrow so as to not interfere with thigh or knee pedaling action.

Another advantage is that the container is formed of a washable fabric such as nylon.

Another advantage is that the container is inexpensive and simple to manufacture.

These and further objects, features and advantages of the present invention will become clearer in light of the following detailed description of the illustrative embodiments of this invention described in connection with the drawings.

BRIEF DESCRIPTION OF THE DRAWINGS

The illustrative embodiments may be best described by reference to the accompanying drawings where:

FIG. 2 is a perspective of the container of FIG. 1 with the straps and the lid open.

FIG. 3 is a detail side view of the container of FIG. 1 shown on the front portion of a bicycle with the straps and lid closed.

FIG. 4 is a detail side view of the container of FIG. 1 with the lid closed about a banana.

FIG. 5 is a section of one of the sidewalls of the container of FIG. 1.

FIG. 6 shows a diagrammatic end view of the container of FIG. 1 with the lid closed in a high position to permit a relatively great volume of articles to be placed in the container, and further indicates how the container is generally the width of the head tube so as to hide behind the head tube.

FIG. 7 shows a diagrammatic end view of the container of FIG. 1 with the lid closed in a medial position.

FIG. 8 shows a diagrammatic end view of the container of FIG. 1 with the lid closed against the upper edges of the sidewalls.

Figure 1:
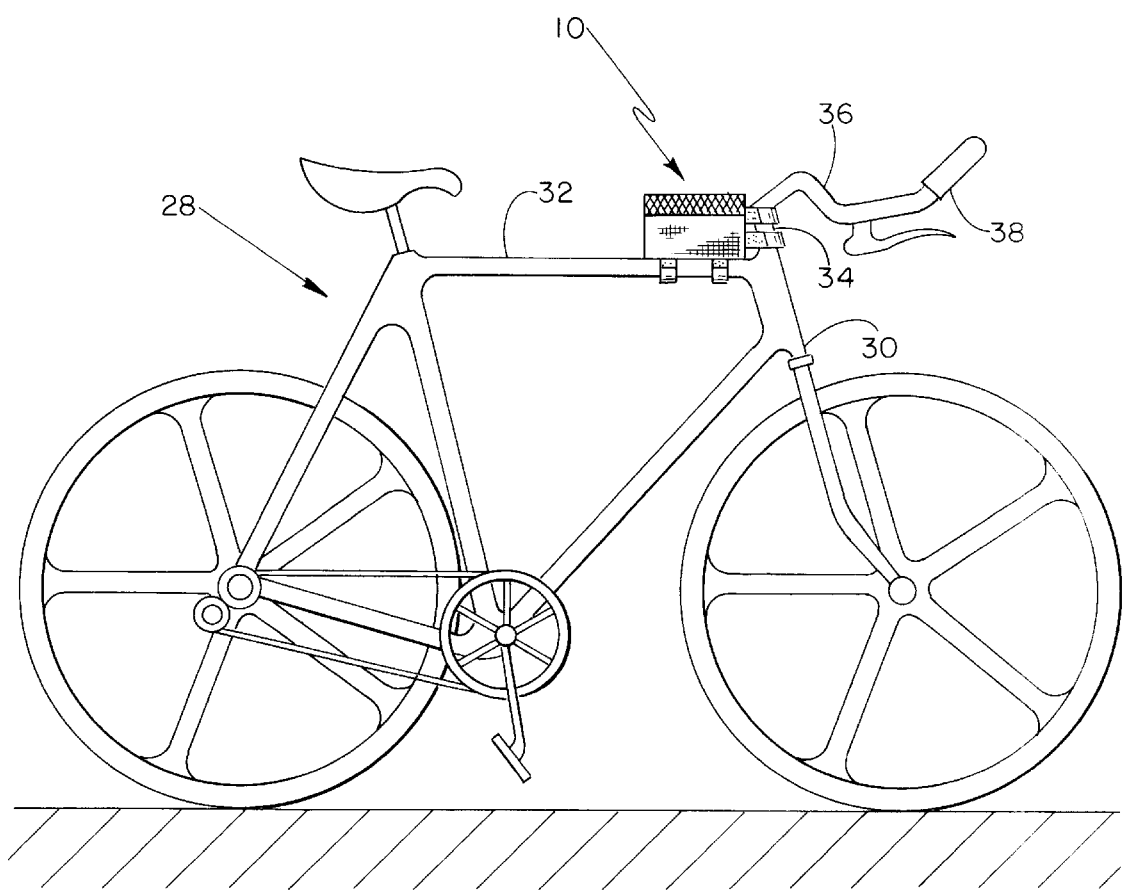
FIG. 1 is a side view of a bicycle having the present container on the top tube and behind the head tube.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

DESCRIPTION

As shown in FIGS. 1 and 2, the container of the present invention is indicated in general by the reference numeral 10. The container 10 includes a body or receptacle 12, a lid 14 for at least partially closing off the receptacle 12, a relatively wide connector strip 16 on the receptacle 12, and another connector strip 18 on the lid 14 for connection to the wide connector strip 16 on the body 12. The container further includes an upper, first pair of head tube connector straps 20, a lower, second pair of head tube connector straps 22, a front, first pair of top tube connector straps 24, and a rear, second pair of top tube connector straps 26.

As shown in FIG. 1, the container 10 is preferably affixed to a bicycle 28 having a head tube 30 and a top tube 32. A stem 34 is the integral base of a set of handlebars 36 and extends from the head tube 30 and is vertically adjustable therein so as to fix the handlebars 36 at the desired height. An aerobar 38 is engaged to the handlebars 36.

More specifically, the receptacle 12 is the body of the container 10. This body or receptacle 12 includes a pair of spaced apart sidewalls 40 engaged at seams or corner portions 42 to a pair of spaced apart front and rear end walls 44. The receptacle 12 further includes a floor 46 engaged to each of the sidewalls 40 via seam 47b. Floor 46 is integral with end walls 44. The receptacle 12 generally forms the shape of a parallelepiped.

Each of the sidewalls 40 includes an outer fabric panel portion 48, an inner fabric panel portion 50, and a stiffener 52 sandwiched between the fabric panel portions 48 and 50 with preferably no adhesive. The fabric panel portions 48 and 50 are stitched together at their rectangular peripheries 53 so as to form a closed pocket 54 for the stiffener 52. The stiffener 52 is a resilient plastic rectangular panel piece which terminates immediately short of such peripheral stitching such that little play or movement of the stiffener 52 is permitted in its respective pocket.

Each of the end walls 44 includes an outer fabric portion 56 and an inner fabric panel portion 58 stitched together at side portions where the end walls 44 meet the sidewalls 40. Stitching is absent between the top and bottom portions of the outer fabric portion 56 and the inner fabric portion 58 so as to form slots 60 at the top and bottom portions of the end walls 44. Inner fabric panel portion 58 includes a U-shaped upper edge portion 62 such that its slot 60 is easy to find and locate a stiffener 64 therein. Stiffeners 64 are resilient plastic rectangular panel pieces which terminate immediately short of the upper and bottom portions and side portions of the end walls 44. Such frictionally fits the stiffeners 64 in their respective slots 60 such that little play or movement of the stiffeners 52 is permitted. However, stiffeners 64 are removable from their slots 60 if a greater degree of flexibility of the container 10 is desired or if it is desired to pack or store the container 10 in a flat configuration, which may be obtained by removing the stiffeners 64 from their slots 60.

Preferably, the floor 46 does not include a stiffener. Such permits the floor 46 to remain highly flexible so as to conform to the top tube 32 of the bicycle 28.

Stiffeners 52 and 64 are in their own individual pockets 54 or slots or pockets 60 and thus are slightly spaced from each other. Accordingly, the corner portions 42 of the container 10 are flexible to a high degree such that the container 10 may be twisted into various parallelograms, when it is viewed from the top, without the container 10 collapsing in on itself. This permits the rider of the bicycle 28 to easily dig into the container 10 without the hindrance of collapsing walls. Another purpose of the stiffeners 52 and 64 is to keep the container 10 in a generally permanently open state.

The lid 14 at least partially closes off an opening 66 formed by the upper portions of the sidewalls 40 and end walls 44. The lid 14 includes a base mesh portion 68 sewn into one sidewall 40 between the outer and inner fabric panel portions 48 and 50. The lid 14 further includes a visible main mesh portion 70 (macroscopically apertured portion) integral with and extending from the base mesh portion 68. Integral with and extending from the main mesh portion 70 is a distal end strip portion 72 of the lid 14 which has engaged thereto the Velcro® hook or loop connector strip 18. Strip 18 is a quick connect and release connector and includes the hook or loop connectors from one end 74 to the other end 76 and from one edge 78 to the other edge 80.

The connector strip 18 engages the Velcro® hook or loop connector 16, which is sewn to the other sidewall 40. Connector 16 has hook or loop connectors running from one end 82 to its other end 84 and from its lower edge 86 to its upper edge 88. The distance from lower edge 86 to upper edge 88 defines a height of the connector 16 and such height is preferably at or greater than about one-fourth the height of its sidewall 40 and still more preferably at or greater than about one-third the height of its sidewall 40.

It can be appreciated that connector strip 16 on its sidewall 40 is greater in width than the connector strip 18 on the lid 14. Placing the thinner connector strip 18 on the lid 14 provides a greater amount of flexibility to the lid 14.

Such a relatively great height of the connector 16 is one feature which permits a quick and secure connection between the connectors 16 and 18. Another feature which permits a quick and secure connection is the flexibility of the lid 14, which permits the connector strips 16 and 18 to be joined at an angular relationship relative to one another, as shown in FIG. 4. Another feature which permits a quick and secure connection is the placement of the hook or loop—or incremental—connectors from one end of the container 10 to the other end of the container 10 and the placement of hook and loop—or incremental—connectors from one end of the lid 14 to the other end of the lid 14. Accordingly, each of the respective points of the connector strips 16 and 18 which participate in a connection, especially when the strips 16 and 18 are joined in an angular relationship, may lie anywhere along its respective connector strip 16 or 18. In other words, even in the worst case scenario, corner portion 90 of connector strip 18 may be quickly and securely connected to corner portion 92 of connector strip 16 so as to at least partially close off the opening 66.

In one closed position of the mesh lid 14, as shown in FIG. 7, the main mesh portion 70 of mesh lid 14 is looped from one sidewall 40 to the other sidewall 40 in generally the form of a semi-circle. In this case, connector strip 18 is generally engaged in an aligned fashion with a middle portion of connector strip 16. In this case, because of its looped form, main mesh portion 70 has a greater length than the width of the floor 46 or the distance from sidewall 40 to sidewall 40. In this case, mesh lid 14 forms a passageway 94 having a diameter about the size of a ordinary banana between itself and each of the end walls 44.

In another closed position of the mesh lid 14, as shown in FIG. 6, an outer edge portion of connector strip 18 is engaged to an upper edge portion of connector strip 16 so as to form a larger passageway 94*a*.

In another closed position of the mesh lid 14, as shown in FIG. 8, an inner edge portion of the connector strip 18 is engaged to a lower edge portion of connector strip 16 so as to form a smaller passageway 94*b*.

Accordingly, it can be appreciated that the lid 14 may be adjusted so as to wrap itself more tightly or more loosely around articles in the container 10. As a hedge against perhaps an unintended excessively tight wrap, the mesh of lid portion 70 is resilient. More specifically, the mesh of lid portion 70 is resilient in the end wall 44 to end wall 44 direction. That is, when stretched in the end wall to end wall direction, the mesh when released returns to its original shape. It is preferred that such mesh has minimal resiliency in the sidewall to sidewall direction. It is further preferred that such mesh has no resiliency in the sidewall to sidewall direction.

The length of the lid 14, minus its secured base 68, is preferably about the height of sidewall 40 such that the lid 14 may be tucked inside of opening 66 to lie against its sidewall 40. More preferably, the length of lid 14, minus its secured base 68, is exactly the height of sidewall 40 such that the outer edge of lid portion 72 lies on floor 46 when the lid 14 is tucked inside of the opening 66.

Each of the straps 20, 22, 24, and 26 has, on one of its faces, hook or loop connectors, such as Velcro® hook and loop connectors. Such hook or loop connectors run from end to end of such face and from edge to edge of such face such that generally the entire face is filled with such hook and loop connectors. Faces having loop connectors are indicated by reference numeral 96 and faces having hook connectors are indicated by reference numeral 98.

Since the faces 96 and 98 open toward the same direction, such faces 96 and 98 meet each other when looped about the head tube 30 (or stem 34) or the top tube 32. Since the hook and loop connectors are incremental connectors, such connector straps 20, 22, 24, and 26 are adjustable in length and thus are adjustable to fit different tube diameters.

Since two pairs of connectors 20 and 22 extend from one end wall, a twisting of the container 10 about a horizontal axis is minimized. Since two pairs of connectors 24 and 26 extend from the floor 46, twisting of the container 10 about a vertical axis is minimized.

Straps 20 and 22 are sewn into seams 42. If desired, straps 20 may be one piece and straps 22 may be one piece to pull on each other through end wall 44. Straps 24 and 26 are sewn into seams 47*b*. If desired, straps 24 may be one piece and straps 26 may be one piece to pull on each other through floor 46.

Example of articles which are preferably placed inside of the container 10 are bananas B, high energy food gels, apples, oranges, and other fruit. Even though such apples and oranges may be greater in width than the stem 34 or head tube 30, such may be tucked inside the expandable container 10. In such a case where apples or oranges or articles of greater width than the stem 34 or head tube 30 are tucked inside the container 10, the stiffeners 52 in the sidewalls bend outwardly in a bow shape and thus provide a shape which minimally increases wind resistance. Further, the stiffeners 52 provide a smooth face to the sidewalls 40 to minimize wind resistance.

Each of the sidewalls 40 and end walls 44 has a length and height. The sidewalls 40 define a width of the receptacle 12 and such width is at or greater than the width of a finger and less than the width of a hand of an ordinary sized adult male. The length of each of the sidewalls 40 is at or greater than the width of a hand of an ordinary sized adult male and less than the length of a forearm of an ordinary sized adult male.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A food or accessory container adapted to be snuggled behind the head tube and on the top tube of a bicycle, with each of the head tube and top tube having a width, comprising, in combination:

a) a receptacle having a pair of opposing sidewalls, a pair of opposing end walls, and a floor, with each of the sidewalls engaging each of the end walls, with the floor engaging each of the sidewalls and each of the end walls, with the sidewalls defining a width of the receptacle and with such width being about the width of the head tube such that the head tube cuts the wind for the receptacle and such that wind resistance of the bicycle is minimally increased when the receptacle is fixed to the bicycle, and with the width of the floor being generally the width of the top tube of the bicycle such that the receptacle does not interfere with thigh and knee pedaling action of a rider on the bicycle;

b) at least one head tube connector engaged to the receptacle and extending from the receptacle to the head tube to which such connector is engaged;

c) at least one top tube connector engaged to the receptacle and extending from the receptacle to the top tube to which such connector is engaged;

d) a first quick connect and release connector portion on one of the sidewalls; and e) a flexible and relatively elongate lid extending between the sidewalls and comprising a pair of side portions, with one side portion being engaged to one sidewall and with the other side portion having a second quick and release connector portion which may engage the first quick connect and release connector portion such that the flexible lid at least partially closes the receptacle, with a distance between the side portions being greater than the width of the receptacle defined by the sidewalls such that the flexible lid may extend up and over items such as bananas which extend beyond the sidewalls.

2. The container according to claim 1 wherein the lid between the side portions comprises a mesh such that one riding the bicycle can see into the receptacle.

3. The container according to claim 2 wherein the mesh is resilient whereby damage to soft items such as bananas is minimized and whereby the lid may extend more readily over items extending beyond the sidewalls.

4. The container according to claim 1 wherein the first and second quick connect and release connector portions comprises respective first and second elongate strips of hook and loop connector material, with such strips generally extending in a direction defined by end wall to end wall such that the receptacle may be opened or closed quickly in competition and such that the receptacle may be opened or closed easily by feel without eye attention to maximize safety in competition.

5. The container according to claim 4 wherein the elongate strip on the sidewall includes a width and such sidewall includes a height, with such width of the such elongate strip being equal to or greater than about one-third the height of such sidewall such that a relatively wide connection base is provided for the elongate strip on the flexible lid, such that the lid may be relatively loosened or tightened by fixing the elongate strip to incremental portions of different altitude on such wide connection base, and so as to maximize chances of a quick and easy connection of the flexible lid to such sidewall without eye attention to such connection.

6. The container according to claim 1 wherein the first and second quick connect and release connector portions comprise respective first and second elongate strips of material, with each of the strips having a length and two ends and incremental connectors extending from end to end, with such strips generally extending in a direction defined by end wall to end wall, with at least a portion of the incremental connectors on one connector portion being engagable to at least a portion of the incremental connectors on the other connector portion regardless of angle orientation of the strips relative to each other such that the strips may be engaged even when disposed obliquely to each other such that the flexible lid may be closed quickly and easily in competition without eye attention from one riding the bicycle.

7. The container according to claim 1 wherein the first and second quick connect and release connector portions are elongate so as to form respective first and second strips, and wherein any incremental portion of the first strip is engagable to any incremental portion of the second strip such that the strips may be obliquely engaged such that the flexible lid may be closed quickly and easily in competition without eye attention from one riding the bicycle.

8. The container according to claim 1 wherein one of the sidewalls includes a height and wherein such flexible lid includes a length, and wherein the height of such sidewall is about the length of the flexible lid such that the flexible lid may be tucked inside the receptacle and into an out-of-the-way position against such sidewall without folding over and onto the floor of the receptacle.

9. The container according to claim 1 wherein each of the sidewalls includes a stiffener portion such that a degree of rigidity is provided to the receptacle to keep the receptacle in an open state such that articles may be quickly and easily retrieved from and put back into the receptacle.

10. The container according to claim 1 wherein each of the end walls includes a stiffener portion such that a degree of rigidity is provided to the receptacle to keep the receptacle in an open state such that articles may be quickly and easily retrieved from and put back into the receptacle.

11. The container according to claim 1 wherein each of the end walls and each of the sidewalls includes a stiffener portion such that a degree of rigidity is provided to the receptacle to keep the receptacle in an open state such that articles may be quickly and easily retrieved from and put back into the receptacle.

12. The container according to claim 11 wherein each of the sidewalls meets each of the end walls at a joint, wherein each of the stiffener portions is spaced from each of the other stiffener portions, and wherein each of the joints is disposed between two stiffener portions such that the joints are flexible to lend flexibility to the receptacle.

13. The container according to claim 10, wherein each of the stiffener portions of the end walls is disposed in a open pocket formed in its respective end wall, with such stiffener portions being removable from its respective open pocket such that an end wall with its stiffener portion removed may be form fit to the head tube.

14. The container according to claim 1 and further comprising at least another head tube connector to minimize twisting of the receptacle relative to the head tube.

15. The container according to claim 1 and further comprising at least another top tube connector to minimize twisting of the receptacle relative to the top tube.

16. The container according to claim 1 wherein each of the head tube connectors comprises at least one strap, with the strap being incrementally adjustable in length such that the strap may engage head tubes of greater or lesser diameters and such that the receptable may be spaced adjacent to or at a distance from the head tube.

17. The container according to claim 1 wherein each of the top tube connectors comprises at least one strap, with the strap being incrementally adjustable in length such that the strap may engage top tubes of greater or lesser diameters and such that the receptable may ride directly on or at a distance above the top tube whereby articles may be tucked between the floor of the receptacle and the top tube.

18. A food or accessory container adapted to be snuggled behind the head tube and on the top tube of a bicycle, with each of the head tube and top tube having a width, comprising, in combination:

a) a receptacle having an opening and further having a width about the width of the head tube and about the width of the top tube such that the head tube cuts the wind for the receptacle, such that wind resistance of the bicycle is minimally increased when the receptacle is fixed to the bicycle behind the head tube, such that a volume of the receptacle is maximized with such minimal increase in wind resistance, and such that the receptacle does not interfere with thigh and knee pedaling action of a rider on the bicycle;

b) at least one tube connector engaged to the receptacle and extending from the receptacle to one of the head and top tube to which such connector is engaged;

c) a first quick connect and release connector portion on the receptacle adjacent the opening;

d) a flexible and relatively elongate lid extending from one side of the opening to another side of the opening and at least partially covering the opening, with the lid having a second quick connect and release connector portion which may engage the first quick connect and release connector portion such that the flexible lid at least partially closes the receptacle, with the flexible lid having a first length defined by a first direction and with the second quick connect and release connector portion having a width defined by the first direction, with the first length minus the width of the second quick connect and release portion connector portion being a distance greater than the width of the receptacle such that the flexible lid may extend up and over items such as bananas which extend out of the receptacle;

f) wherein the lid comprises a macroscopically apertured portion which extends over the opening when the lid is closed such that one riding the bicycle may see into the receptacle; and g) wherein the first and second quick connect and release connector portions comprise respective first and second elongate strips of material, with each of the strips having a length and two ends and incremental connectors extending from end to end, with such strips generally extending in a direction defined by the top tube, with at least a portion of the incremental connectors on one connector portion being engagable to at least a portion of the incremental connectors on the other connector portion regardless of angle orientation of the strips relative to each other such that the strips may be engaged even when disposed obliquely to each other such that the flexible lid may be closed quickly and easily in competition without eye attention from one riding the bicycle.

19. The container of claim 18 wherein the lid when closed provides a passageway between the lid and the receptacle such that an elongate article having the thickness and length of a conventional banana may extend through such passageway.

20. A bicycle mounted relatively small container, with the bicycle having a frame, with the container comprising, in combination:

a) a receptacle having a pair of opposing sidewalls, a pair of opposing end walls, and a floor, with each of the sidewalls engaging each of the end walls, with the floor engaging each of the sidewalls and each of the end walls, with the sidewalls and end walls defining an opening, with each of the sidewalls and end walls having a length and height, with the sidewalls defining a width of the receptacle and with such width being at or greater than the width of a finger and less than the width of a hand of an ordinary sized adult male, with the length of each of the sidewalls being at or greater than the width of a hand of an ordinary sized adult male and less than the length of a forearm of an ordinary sized adult male;

b) wherein each of the sidewalls and end walls includes a stiffener to lend stiffness to the container, with each of the stiffeners extending generally the length and height of its respective sidewall or end wall, with each of the stiffeners being formed of a resilient material, with each of the stiffeners being spaced from each of the other stiffeners where the sidewalls meet the end walls to lend flexibility at such locations and thereby lend flexibility to the container;

c) at least one frame connector engaged to the receptacle and extending from the receptacle to the frame to which such connector is engaged;

d) a first quick connect and release connector portion on the receptacle adjacent the opening;

e) a flexible and relatively elongate lid extending from one side of the opening to another side of the opening and at least partially covering the opening, with the lid having a second quick connect and release connector portion which may engage the first quick connect and release connector portion such that the flexible lid at least partially closes the receptacle, with the flexible lid having a first length defined by a first direction and with the second quick connect and release connector portion having a width defined by the first direction, with the first length minus the width of the second quick connect and release portion connector portion being a distance greater than the width of the receptacle such that the flexible lid may extend up and over items such as bananas which extend out of the receptacle;

f) wherein the lid comprises a macroscopically apertured portion which extends over the opening when the lid is closed such that one riding the bicycle may see into the receptacle; and g) wherein the first and second quick connect and release connector portions comprise respective first and second elongate strips of material, with each of the strips having a length and two ends and incremental connectors extending from end to end, with such strips generally extending in a direction defined by a direction of travel of the bicycle, with at least a portion of the incremental connectors on one connector portion being engagable to at least a portion of the incremental connectors on the other connector portion regardless of angle orientation of the strips relative to each other such that the strips may be engaged even when disposed obliquely to each other such that the flexible lid may be closed quickly and easily in competition without eye attention from one riding the bicycle.

* * * * *